US006691463B1

(12) United States Patent
Richmond (10) Patent No.: US 6,691,463 B1
(45) Date of Patent: Feb. 17, 2004

(54) KENNEL DOOR APPARATUS (76) Inventor: Robert A Richmond, 1888 Colora Rd., Colora, MD (US) 21917

( * ) Notice: Subject to any disclaimer, the term of this patent is extended or adjusted under 35 U.S.C. 154(b) by 0 days.

(21) Appl. No.: 09/225,444

(22) Filed: Jan. 6, 1999

Related U.S. Application Data (63) Continuation-in-part of application No. 08/453,984, filed on May 30, 1995, now abandoned.

(51) Int. Cl.[7] .............................................. E05F 11/00
(52) U.S. Cl. ............................ 49/360; 119/484; 49/169
(58) Field of Search .......................... 49/169, 170, 360, 49/324; 119/484, 482

(56) References Cited

U.S. PATENT DOCUMENTS

| 879,716 A | * | 2/1908 | Alsop | 49/170 |
| 1,888,612 A | * | 11/1932 | Anderson | 49/360 X |
| 4,322,913 A | * | 4/1982 | Himmer | 49/169 X |
| 4,384,376 A | * | 5/1983 | Shrode | 49/169 X |
| 4,760,872 A | * | 8/1988 | Hale | 49/169 X |

FOREIGN PATENT DOCUMENTS

| GB | 288507 | * | 4/1928 | 49/170 |

* cited by examiner

Primary Examiner—Jerry Redman
(74) Attorney, Agent, or Firm—Krieg DeVault Lundy, LLP

(57) ABSTRACT

A kennel door apparatus for selectively "opening" and "closing" a kennel door, the kennel door is sized to cover an opening located in a kennel wall between a kennel pen and a common kennel area for selective access thereto. A door opening attachment may be used to cover the opening in the kennel wall. The kennel door apparatus is adapted for horizontal and vertical sliding door actuation. First and second opposing channel guides are secured to opposing sides of a protective panel. A sliding door is slidably received between the wall confronting side and the panel side of the opposing channel guides. The opposing channel guides are secured about an opening in the kennel wall, and at least one cable is used to pull the sliding door between "open" and "closed" positions. A weather strip is secured to the sliding door between the opposing channel guides. The weather strip is positioned beneath the protective panel when the sliding door is in the "closed" position. The cable may be remotely actuated to selectively move more than one kennel door between "open" and "closed" positions by manual, electrical, hydraulic, or pneumatic.

13 Claims, 7 Drawing Sheets

KENNEL DOOR APPARATUS

This patent application is a continuation in part of patent application Ser. No. 08/453,984, filed May 30, 1995, now abandoned.

This invention is directed to an improved kennel door apparatus, designed to fit a new or existing opening in a kennel wall. More specifically, this apparatus provides a slidable kennel door, which may be remotely controlled for selective access to and from a plurality of kennel pens to a common kennel run area. This kennel door apparatus is adapted for vertical or horizontal sliding door actuation. Most kennel walls are made of concrete or cement block construction, with openings extending through the kennel wall from each of the individual kennel pens to a common kennel run. The openings must be selectively actuated to provide safe and efficient animal control, and to selectively restrict access to the kennel run during cleaning, maintenance, etc.

BACKGROUND OF THE INVENTION

The following patents are representative of the art in animal access doors:

U.S. Pat. No. 4,322,913 issuing to Robert Himmer on Apr. 6, 1982, discloses an automatic door for pets which slides in opposing tracts, or is hinged as shown in FIG. 5. The door may have a window inserted in the door, and the door is raised and lowered with an electric motor when a pet steps on a pressure pad.

U.S. Pat. No. 4,754,797 issuing to Robert Sronce on Jul. 5, 1988, discloses an animal door having a pliant door and a removable sliding door to seal off the pliant door.

U.S. Pat. No. 4,384,376 issuing to June, Shrode on May 24, 1983 discloses a shower door assembly, wherein a door is manually moved horizontally by a handle to access shower handles, without opening the shower door.

U.S. Pat. Nos. 4,651,793 and 3,797,554 are representative of other pet door structures utilizing swinging doors.

U.S. Pat. Nos. 1,888,612 and 1,442,553 are representative of doors which are vertically slidable between opposing rails, which do not provide nor make obvious the use of a protective panel to prevent pets from chewing on the door or on the cable when the door is raised.

SUMMARY OF THE INVENTION

The kennel access door disclosed herein, comprises two opposing channel guide members to guide the door between opening and closing positions. The opposing channel guide members are secured to a protective panel extending above or beside the access opening to protect the sliding door and cable from being chewed by the animals when the door is opened. The protective panel further serves to position and align the opposing channel guide members for ease of installation about the kennel opening. A weather strip is secured to the panel door to reduce air flow through the kennel access door when the door is closed. A cable secured to the panel door extends through the end of the protective panel, enabling the user to selectively "open" and "close" the sliding door for vertical actuation. Opposing cables are secured to the sliding door for horizontal actuation. One or more pulleys may be used to route the cable to a convenient location to remotely "open" and close the panel door to selected kennel enclosures, providing individual and selective group access to common kennel areas, such as a kennel run. The kennel door apparatus disclosed herein, is preferably mechanically actuated, which enables the operator to actuate the kennel doors even when there is an electrical failure, which may occur during emergency situations, such as a kennel fire, flood, tornado, etc.

Other objects and features of the present invention will become apparent from a consideration of the following description with reference to the accompanying drawings, wherein example embodiments of the invention are selected by way of illustration and not by way of restriction.

DETAILED DESCRIPTION OF THE DRAWINGS

DETAILED DESCRIPTION OF THE PREFERRED EMBODIMENTS

Figure 1:
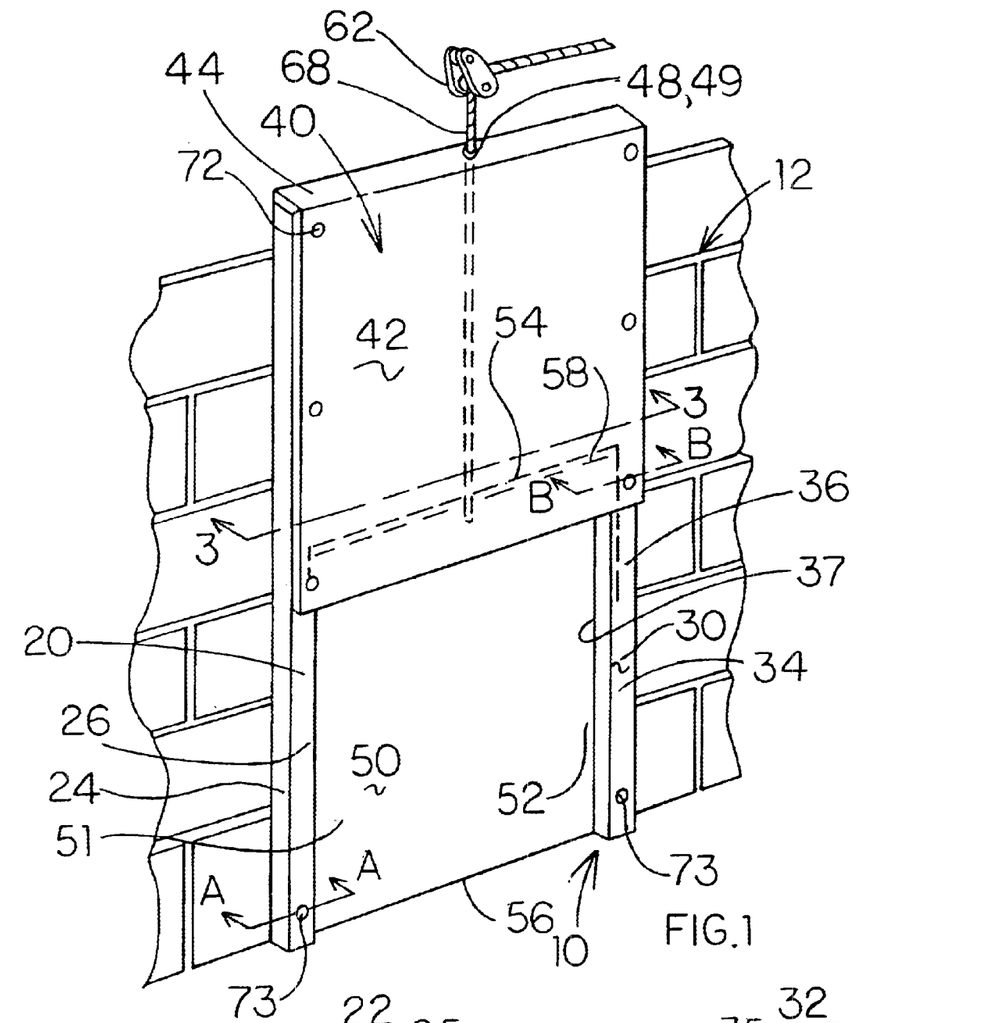
FIG. 1 is a perspective view of the kennel door apparatus vertically installed about a kennel wall opening, with the access door in a "closed" position.

As shown in FIG. 1, the kennel door apparatus 10 is mounted to a kennel wall 12 having a new or existing access opening 14 therein. The access opening 14 typically includes a bottom aperture portions 15, opposing side aperture portions 16, 17, and a top aperture portion 18. The access opening 14 may be uniformly sized from kennel pen 19 to kennel pen 19, or the size of the access openings 14 may vary to suit the intended use by different sized animals (not shown).

The kennel door apparatus 10 may be installed on the inside or outside of the kennel pen 19, to suit user preference and the structural limitations of the kennel site.

Figures 2, 4:
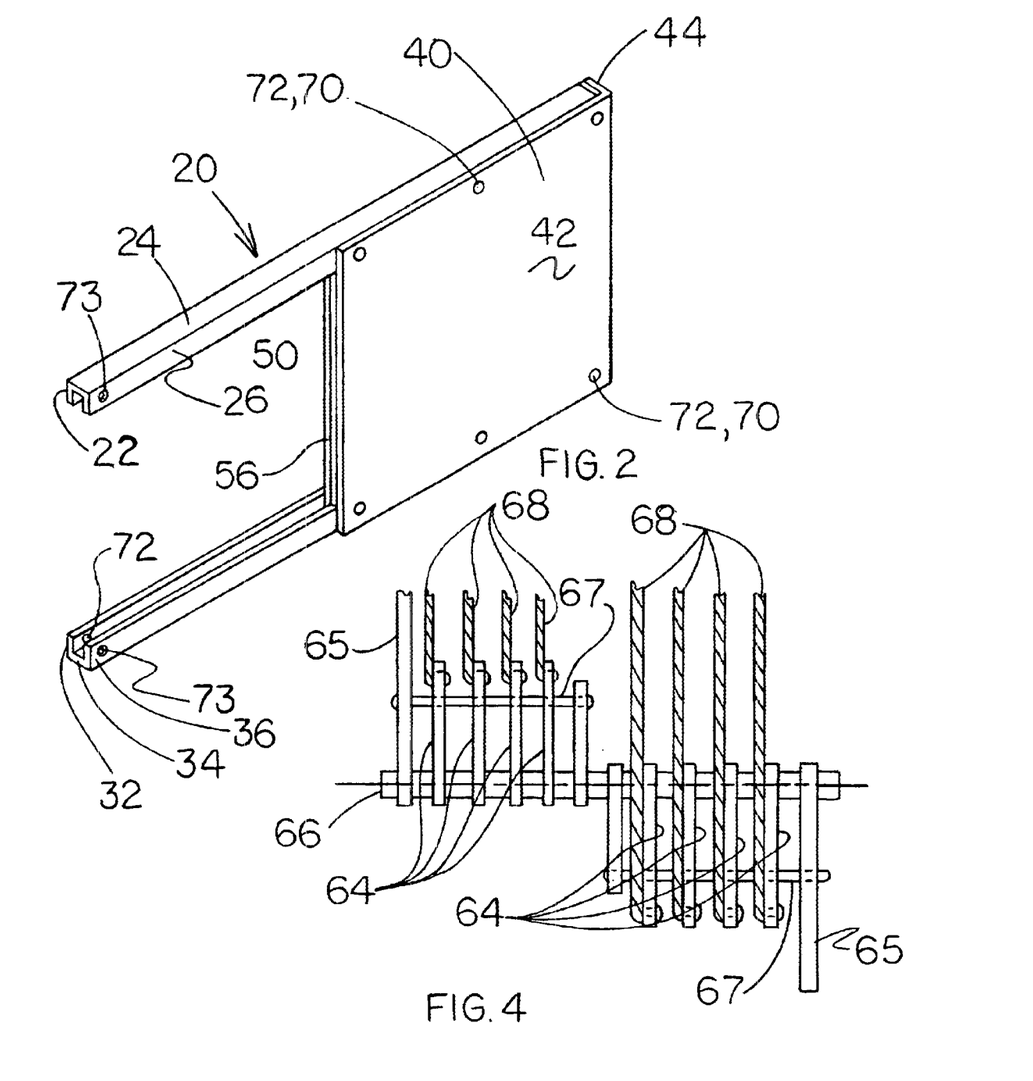
FIG. 2 is a perspective view of the kennel door apparatus prior to installation, shown with the access door in an "open" position.
FIG. 4 is a top view of cables extending from respective kennel door apparatus, adapted for manual lever actuation.

As shown in FIG. 2, the kennel door apparatus 10, may be pre-assembled to provide proper alignment of the first and second channel guide members 20, 30 in relation to the protective cover 40 prior to installation. This saves valuable time and effort during installation of the kennel door apparatus 10, and ensures that the first and second channel guide members 20, 30 are properly aligned for ease of operation, when "opening" and "closing" the sliding door 50.

Most kennel walls 12 are made of concrete or cement block construction, for durability and ease of maintenance. The opening 14 in the kennel wall may 12 not be precisely square which makes installation of prior art separate channel guide members time consuming and expensive to install.

The pre-assembled kennel door apparatus 10 of this invention is shown in FIG. 2. The pre-assembled kennel door apparatus 10 may also be used as a guide to mark the kennel wall 12 prior to cutting an access opening 14 in the kennel wall 12.

Figure 3:
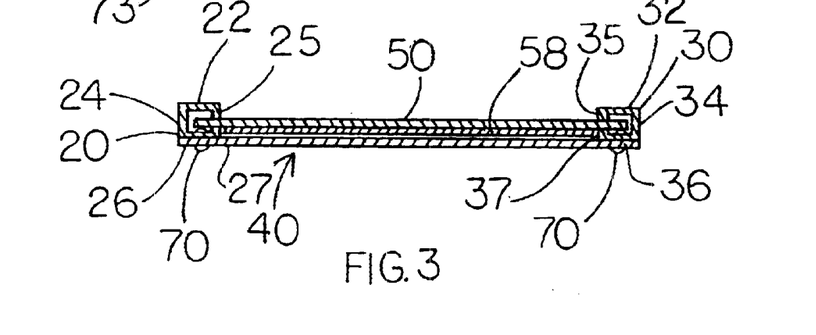
FIG. 3 is a cross sectional view of the kennel door apparatus taken along lines 3—3 in FIG. 1.
Figures 5A, 5B:
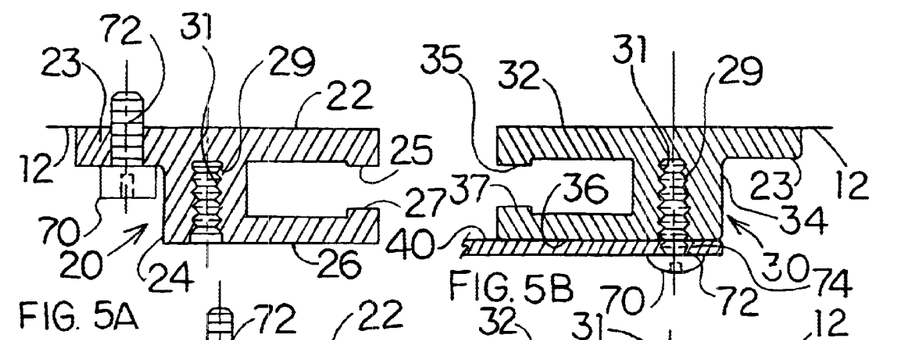
FIG. 5A is a cross sectional view taken along lines A—A in FIG. 1, showing one channel mounting configuration.
FIG. 5B is a cross sectional view taken along lines B—B in FIG. 1, showing one protective panel mounting configuration.
Figures 6A, 6B, 7A, 7B, 9:
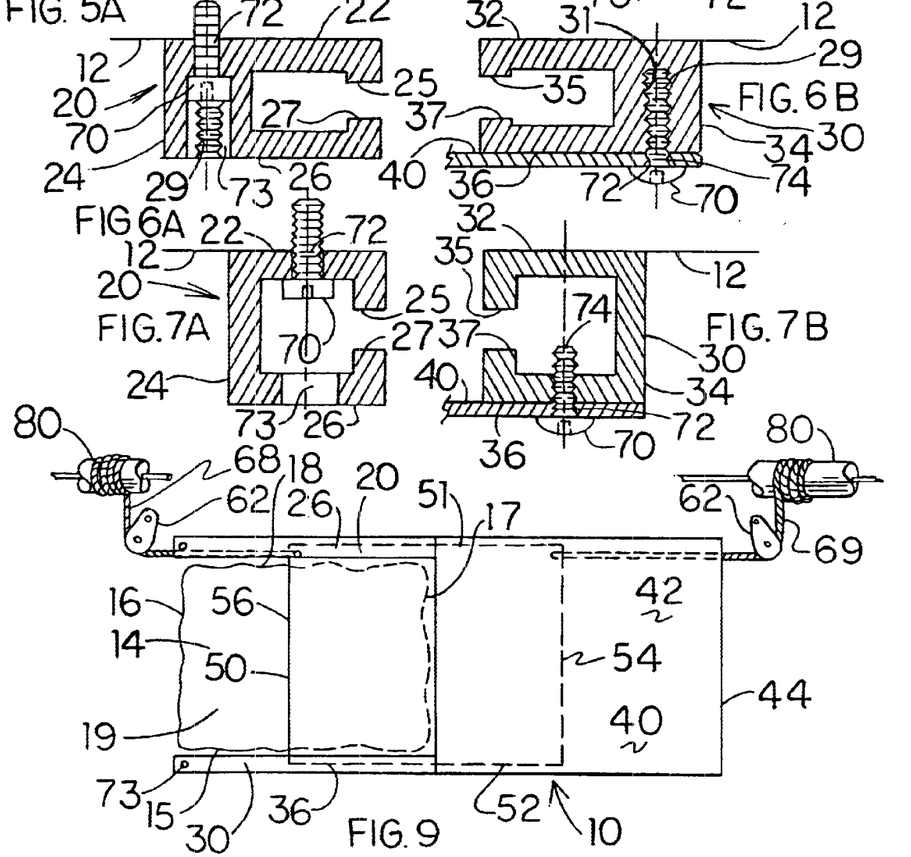
FIG. 6A is a cross sectional view taken along lines A—A in FIG. 1, showing another channel mounting configuration.
FIG. 6B is a cross sectional view taken along lines B—B in FIG. 1, showing another protective panel mounting configuration.
FIG. 7A is a cross sectional view taken along lines A—A in FIG. 1, showing yet another channel mounting configuration.
FIG. 7B is a cross sectional view taken along lines B—B in FIG. 1, showing yet another protective panel mounting configuration.
FIG. 9 is a front view of a horizontally sliding door of this invention, showing the use of opposing cables used to "open" and "close" the sliding door.

The first channel guide members 20, shown in cross-section in FIG. 3 and FIG. 5A comprises a first wall confronting member 22, a first side extending member 24, and a first panel confronting member 26. As shown in FIG. 5A and FIG. 6A, panel apertures 72 are sized to receive a conventional fastening means 70, such as a machine screw, bolt, rivet, etc. to secure the protective panel 40 to the kennel wall 12. A screw slot 29 having a plurality of opposing ridges 31 are sized to receive a screw thread therein, to secure the protective panel 40 to the first channel guide member 20 and to the second channel guide member 30.

As shown in FIG. 6A and FIG. 6B, the first and second channel guide members 20, 30 preferably have an elongated screw slot 29 extending the length of each channel guide member 20, 30. This enables the protective panel to be easily aligned and installed upon the first and second channel guide members 20, 30, without regard for vertical tolerances. The elongated screw slot 29 has opposing ridges 31 which are sized to be closely received by a fastening means 70 of a selected size, such as a No. 10 self tapping screw. Of course, other fastening means of other sizes may also be used, and such use is intended to be included within the scope of the following claims.

As best shown in FIG. 6A, a counter-sunk hole 73 may be positioned in alignment with the screw slot 29, to receive a suitable fastening means 70 therein. As shown in FIG. 6B, the protective panel 40 is secured by a suitable fastening means 70 which extends through an aperture 74 in the protective panel 40, to engage the screw slot 29 in respective first and second channel guide members 20, 30. This eliminates the need for a mounting flange 23 shown in FIG. 5A and FIG. 5B.

FIG. 7A shows an alternative embodiment, wherein an enlarged clearance hole 73 extends through the panel confronting side 26 of respective channel guide member 20 in alignment with a mounting hole 72 fastening means 70 extending through the wall confronting side of the channel guide member 20. In this configuration, the sides 25, 27 are extended to provide clearance between the head of the fastening means 70 and the sliding door 40.

The first and second channel guide members 20, 30 are secured to the wall 12 with the sliding door in the open or raised position shown in FIG. 2 to provide access to fastening means 70, as shown in FIG. 7A. With the door 40 closed, as shown in FIG. 1, access to fastening means 70 is restricted by door 40.

While the preferred wall 12 mounting configurations are shown in FIG. 5A, FIG. 6A and FIG. 7A, and the protective panel 40 mounting configurations are shown in FIG. 5B, FIG. 6B and FIG. 7B, it is understood that the wall 12 mounting configurations and the protective panel 40 mounting configurations are common to both first and second channel guide members 20, 30.

Likewise, the second channel guide member 30, shown in cross-section in FIG. 6B, comprises a second wall confronting member 32, a second side extending member 34 and a second panel confronting member 36. Panel apertures 72 are sized to receive a conventional fastening means 70, such as a machine screw, bolt, rivet, etc. to secure the protective panel 40 to the second channel guide member 30.

Alternatively, the protective panel 40 may be secured to the first and second channel guide members 20, 30 by other conventional fastening means, such as by gluing, welding, etc., without departing from the spirit of this disclosure, or of the scope of the following claims. The first and second channel guide members 20, 30 are preferably made of metal for strength and durability. Preferably, the first and second channel guide members 20, 30 are extruded of aluminum and cut to length.

The first and second channel guide members 20, 30 are preferably secured to the kennel wall 12 in several locations, with conventional fastening means 70 which extend through a suitably sized apertures 72 located along the wall confronting side 22, 32 of respective channel guide members 20, 30. An enlarged aperture 73 in alignment with each respective aperture 72 provides access to fastening means 70 for ease of installation.

As best shown in FIG. 5A and FIG. 5B, an external mounting flange 23 may extend from the channel guide members 20, 30, for ease of mounting the kennel door apparatus 10 to the kennel wall 12. However, the kennel door apparatus disclosed herein is preferably mounted as shown in FIG. 6A and FIG. 6B, or FIG. 7A and FIG. 7B to reduce manufacturing costs, to provide a more compact installation, and to reduce the size and weight of the kennel door apparatus 10 for ease of shipping and handling.

The protective panel 40 preferably is formed with a front protective panel portion 42 and an end protective panel portion 44. The protective panel 40 is preferably made of chew resistant metal such as aluminum sheet stock of from 0.015 to 0.375 in thickness. Alternately, the protective panel 40 may be installed on opposing sides of the first and second channel guide members 20, 30 to protect the enclosed cable 68 from being chewed by animals.

Where the protective panel 40 is secured to the first and second channel guide members 20, 30 with conventional fastening means, such as a screw, bolt or rivet, etc. apertures 74 may be provided in the sides of the protective panel 40 in alignment with the apertures 72 in the first and second channel guide members 20, 30 to receive and secure the fastening means therethrough.

A cable aperture 48 is preferably centered in the end of the protective panel portion 44, to receive and guide cable 68 therethrough. A cable grommet 49 may be secured about the cable aperture 48 to better slidably receive the cable 68 therethrough.

Cable 68 is preferably a twisted or woven metal cable which is sized to extend from the sliding door 50 to a remote location for ease of access to a plurality of kennel door apparatus 10. Metal cable 68 is preferred for strength and durability. Preferably the cable 68 is selected from a range of from one eighth inch to three-eighth inches in diameter. The cables 68 may optionally be coated with a plastic coating or covering, as practiced in the art, to suit user preference.

The sliding door 50 is sized to be slidably received between the respective first and second wall confronting members 22, 32, and the first and second panel confronting members 26, 36. Allowance is preferably provided for changing temperature and expansion and contraction of materials within anticipated temperature extremes.

Preferably, the first and second wall confronting members 22, 32 and the first and second panel confronting members 26, 36 each have sliding door confronting lips 25, 27 and 35, 37 to reduce the friction against the sliding door 50 as it is moved between "open" and "closed" positions. The respective sliding door confronting lips 25, 27 and 35, 37 also serve to provide clearance for the fastening means 70, as best shown in FIG. 7A.

The sliding door 50 is made of metal or plastic sheet materials, having a thickness selected from a range of 0.018 to 0.380 inches.

Preferably, a transparent or translucent plastic sheet stock may also be used, for visibility between the kennel run and the individual kennel pens 19. The sliding door 50 has a first door side 51 and a second door side 52 which are sized to slide between opposing first and second side members 24, 34.

The first end 56 of the sliding door 50 preferably extends flush or below the bottom 15 of kennel opening 14, while the second end 54 of the sliding door 50 remains beneath the protective panel 40. When the sliding door 50 is biased into an "open" position, the first end 56 of the sliding door 50 extends beneath the protective panel 40 to restrict damage from animals attempting to chew on the sliding door 50.

A cable 68 is secured to the second end 54 of the sliding door 50, which is also protected from damage from animals chewing on the cable 60, as the cable 68 remains beneath the protective panel 40 when the sliding door 50 is lowered into a "closed" position. Alternately, when the kennel door apparatus 10 is mounted horizontally, as shown in FIG. 9, an opposing cable 69 may be used to selectively "open" and "close" the sliding door 50.

Preferably, a weather strip 58 is secured along end 54 of the sliding door 50 between the first and second channel guide members 20, 30 to reduce drafts between the sliding door 50 and the protective panel 40. The weather strip 58 may be made from metal, plastic, foam, felt, fabric, or other known material to suit manufacturing preference.

Figures 10, 13:
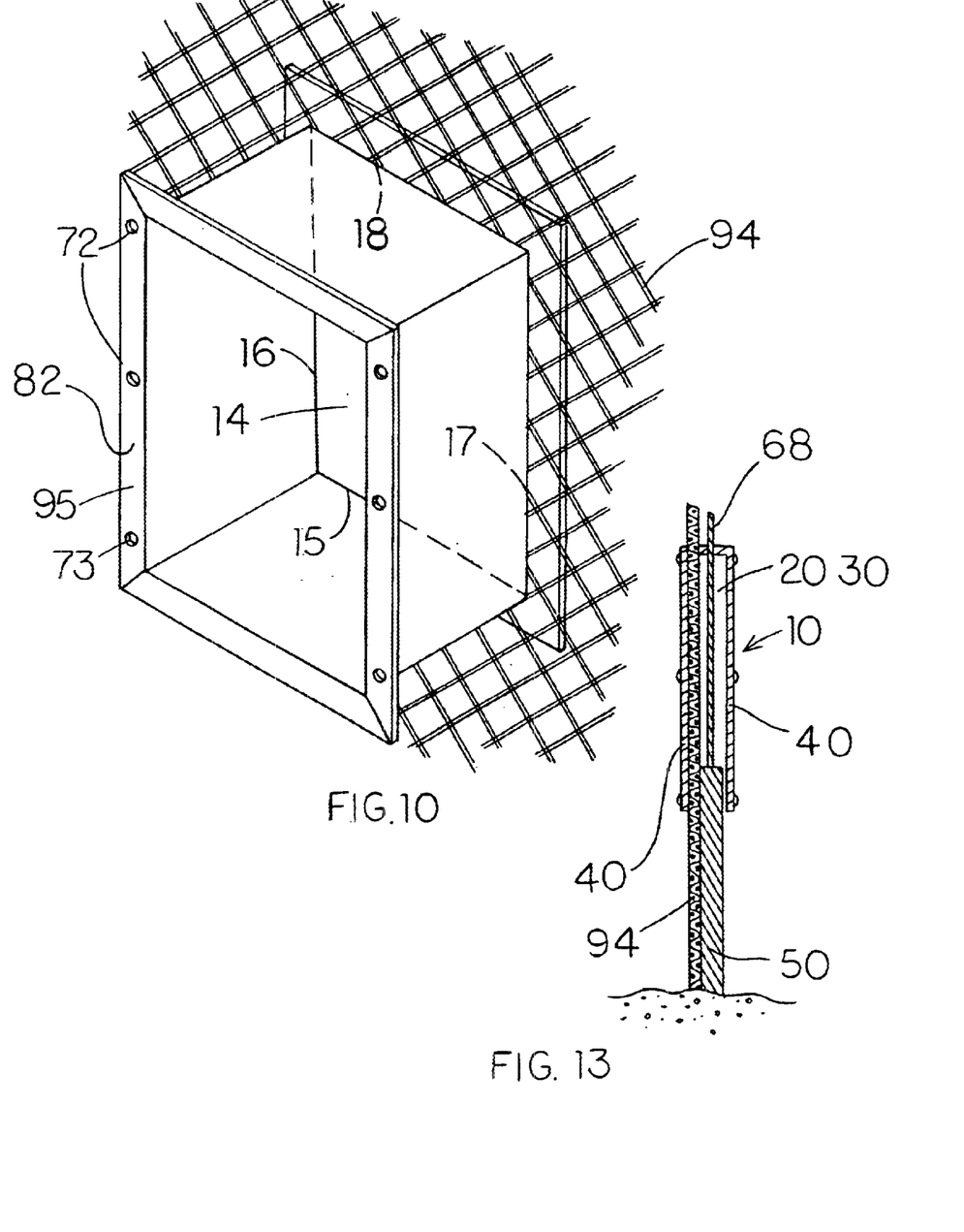
FIG. 10 is a perspective view of a door opening attachment used to extend the length of the passage through the enclosure.
FIG. 13 is a fragmentary cross-sectional view a kennel door apparatus mounted to a wire fence kennel wall taken essentially vertically through the door between the channel guide member and the connection between the door and the guide cable, the apparatus having a protective panel secured to both sides of the apparatus.
Figure 11:
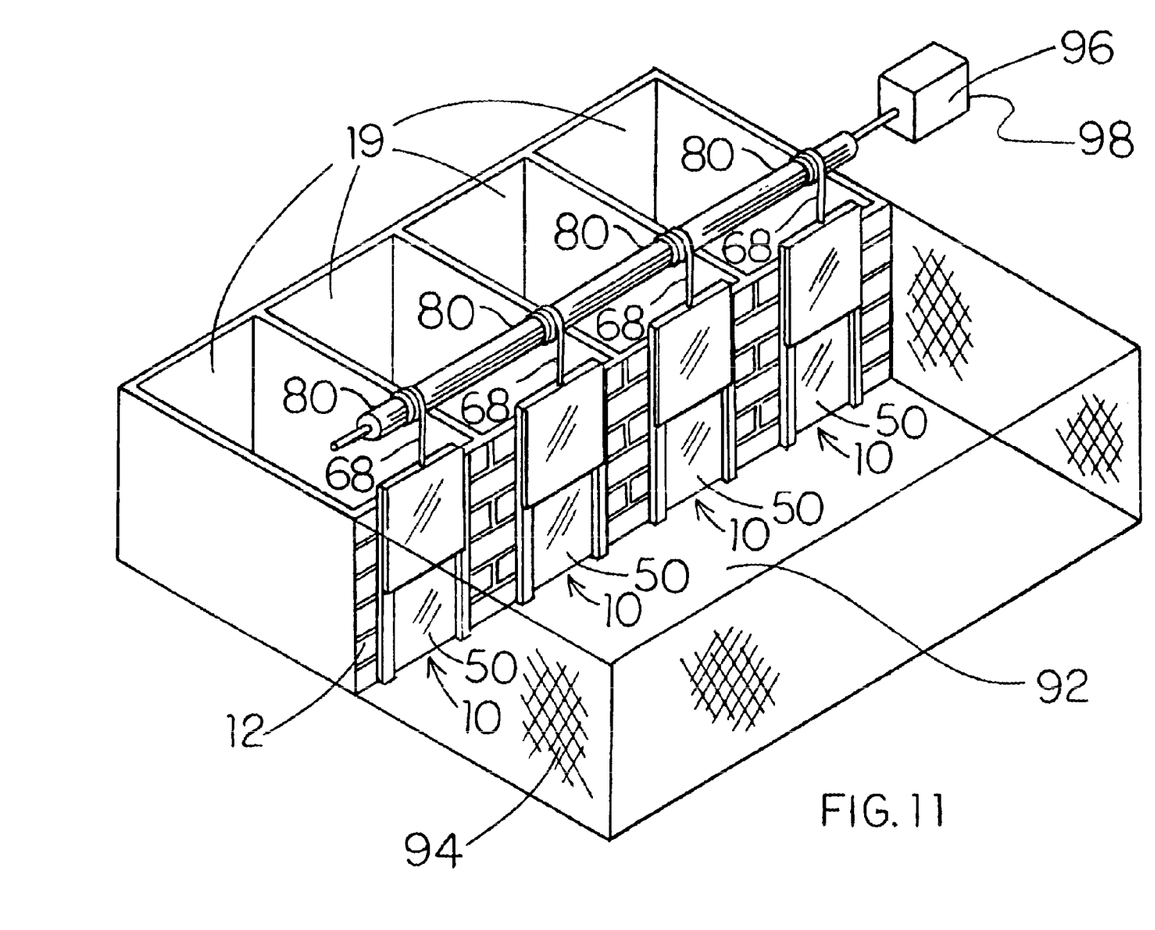
FIG. 11 is a perspective view of a complete kennel having several kennel door apparatuses attached to the kennel wall at the kennel wall opening leading to each of several individual kennel pens, the openings leading to a common kennel run area, the sliding door of each apparatus being actuated by a reel system controlled from a remote location by a motor.
Figure 12:
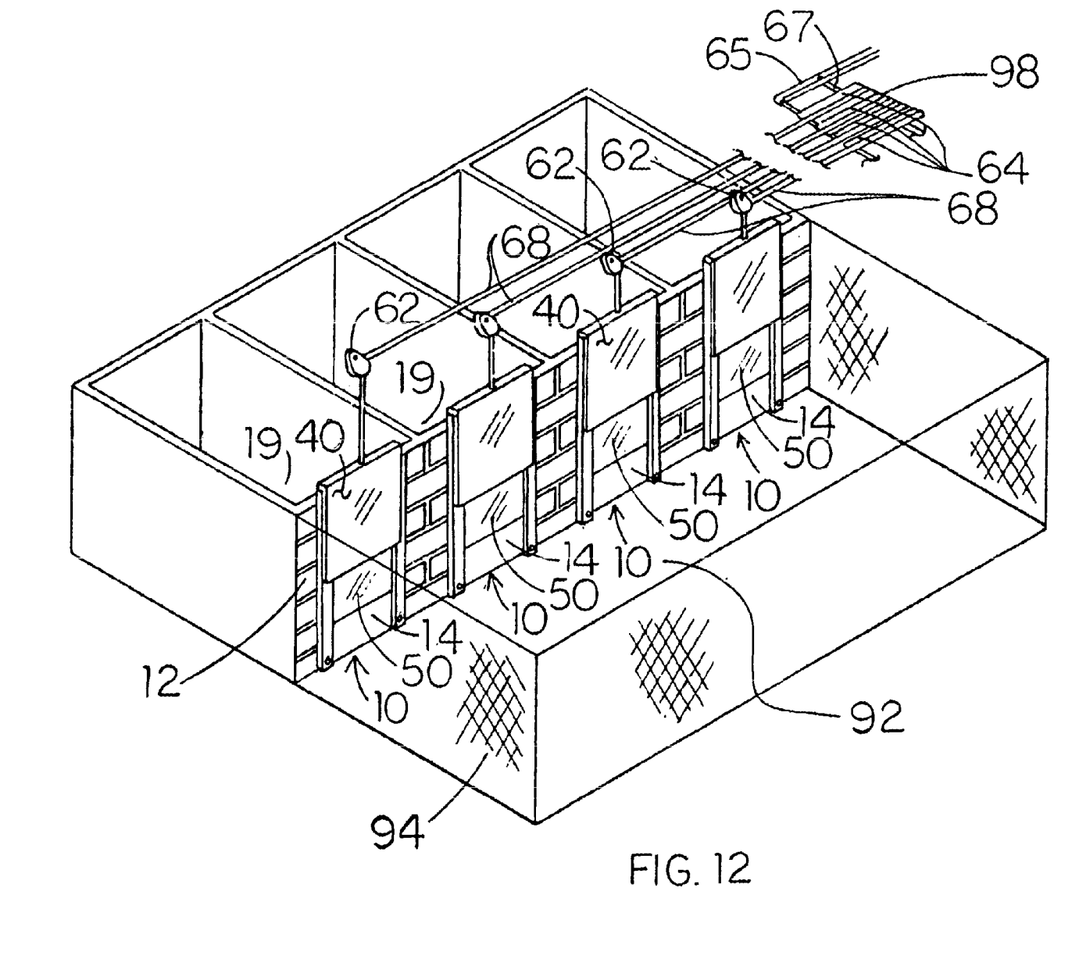
FIG. 12 is a perspective view of a complete kennel such as in FIG. 11, but for which the sliding door of each apparatus is actuated by a pulley and lever system manually controlled form a remote location.

A door opening attachment 82 may be used to extend the opening, as shown in FIG. 10. The door opening attachment 82 is useful where the opening is rough or thick, such as when extending through a block wall, or a wire fence, etc.

The kennel door apparatus 10 of this invention may be installed for either horizontal or vertical use, wherein the sliding door 50 is biased between "open" and "closed" positions, without departing from the scope of this disclosure, or from the scope of the following claims. See FIG. 1 and FIG. 7.

One or more pulleys 62 may be used to route the cable 68 to a remote area for ease of manipulation of the sliding door 50 between "open" and "closed" positions. A one or more remote lever(s) 64 may be pivotally secured 66 to a remote kennel wall 12 or control panel (not shown), to selectively extend and retract the cable 68. When the sliding door is installed for vertical actuation, the weight of the sliding door 50 serves to pull the cable into the "closed" position when the lever 64 is moved to the "closed" position, and the lever 64 is preferably manually biased into an "open" position to raise the sliding panel 50.

In this way, the operator may selectively actuate one or more kennel door apparatus 10 from a remote location. A bar 67 may be releasably secured to extend through more than one lever 64, for ease of simultaneous manual actuation of more than one lever 64. Where individual lever 64 control is preferred, bar 67 may be removed to provide individual lever 64 control. Handle 65 makes actuation of bar 67 easier to operate. This is especially useful in emergency situations where it is desirable to open more than one kennel door 50 simultaneously. See FIG. 4.

The kennel door apparatus 10 disclosed herein is easy to clean with water hose and/or disinfectant, and will not absorb odors. The component parts of the kennel door apparatus are chew resistant, and easy to install. The kennel door apparatus 10 is preferably packaged in a kit, with all necessary hardware and instructions included, for assembly on site.

The kennel door apparatus 10 preferably comes in two exemplary sizes: a twelve inch wide by 22 inch tall size for smaller animals; and a fifteen inch wide by 29 inch tall size for larger animals. However, it is within the scope of one of average skill in this art to make other sizes to fit a variety of animals and/or kennel wall opening sizes and thicknesses, and such alternate opening sizes and opening thicknesses are intended to fall within the scope of the following claims.

In operation, the cable 68 may be selectively biased to move the sliding door between "open" and "closed" positions. Where multiple kennel door apparatus 10 are employed, such as to provide access from individual kennel pens 19 to a common kennel run, the various cables 68 may be routed to a remote location, and manually actuated between "open" and "closed" positions.

Preferably, as shown in FIG. 4, when the sliding door is vertically mounted, each lever 64 extends over-center in the "open" position to resist cable tension and the weight of the sliding door 50 from inadvertently moving the cable to a "closed" position. A bar 67 may be employed to pivotally bias more than one lever 64 to move a plurality of sliding doors between "open" and "closed" positions. By way of an example, a six inch lever 64 will draw twelve inches of cable 68 when the lever 64 is pivoted 180 degrees. Likewise, a nine inch lever 64 will draw eighteen inches of cable 68 when the lever 64 is pivoted 180 degrees.

Figure 8:
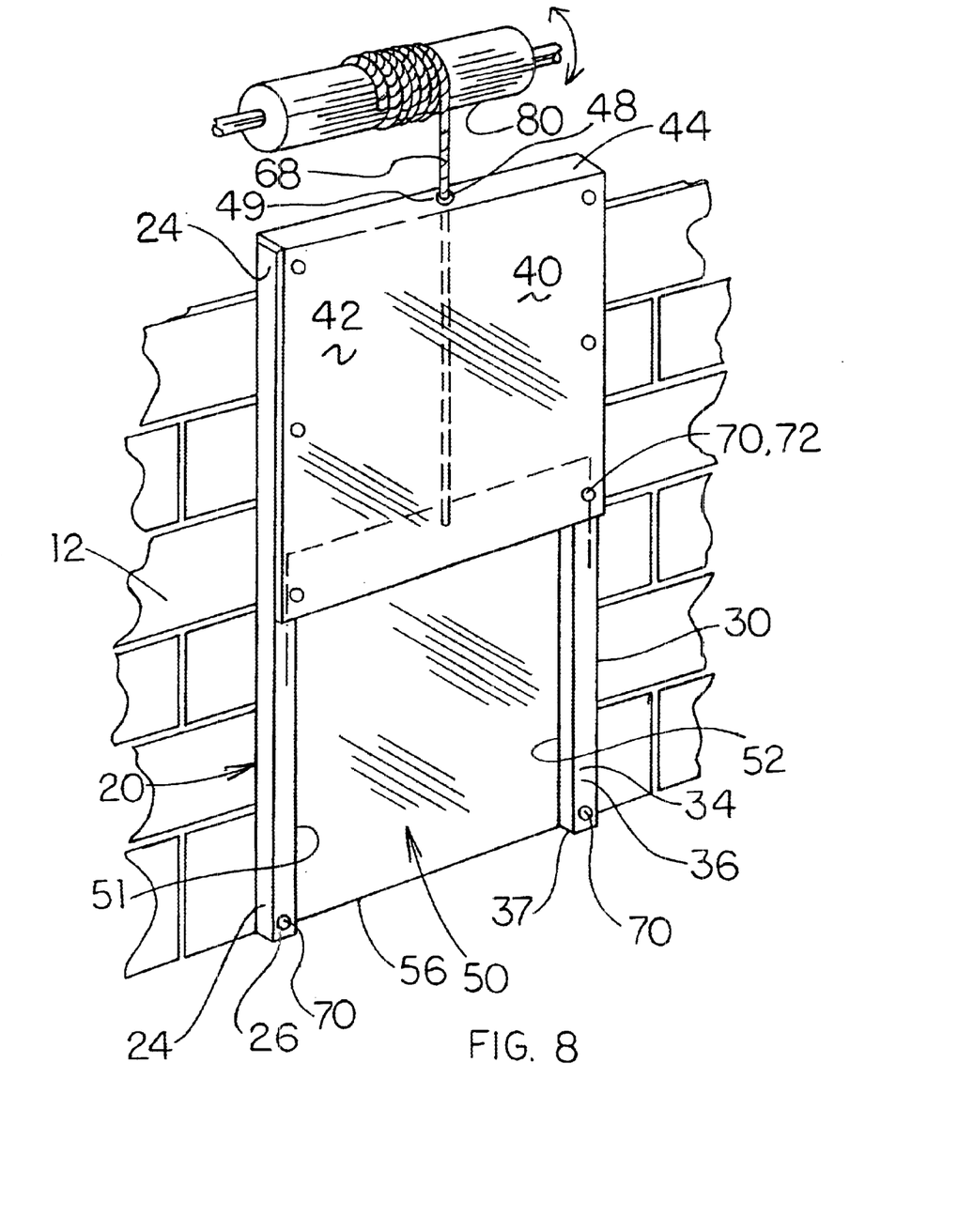
FIG. 8 is a front view of a vertically sliding door, wherein a reel is rotatably actuated to selectively "open" and "close" the sliding door.

Of course, one of average skill in this art could adapt this kennel door apparatus 10 to be controlled by electric or hydraulic or pneumatic actuation, and such adaptations are intended to fall within the scope of the following claims. By way of example, FIG. 8 shows the cable 68 being wound upon a reel 80 which may be selectively actuated by a suitable motor or cylinder mechanism (not shown) which are well known in the art for biasing a cable 68 between extended and retracted positions. Such a motor may be actuated from a remote location.

Alternately, as shown in FIG. 9, the sliding door 50 may be horizontally actuated by winding one of the cables 68, 69 on a reel 80 in a clockwise rotation, while the other cable 68, 69 is wound on a similar reel 80 in a counter clockwise rotation. The same reel 80 may be used, where the cable 68 is wound in one rotational direction, and the cable 69 is wound in the opposite rotational direction, so that rotation of reel 80 simultaneously extends one cable 68, 69 while retracting an equal amount of the other cable 68, 69.

The kennel door apparatus 10 disclosed herein may be adapted for use horizontally, with one cable 68 used to pull the sliding door 50 into an "open" position, and an oppositely positioned cable 69 used to pull the sliding door 50 into a "closed" position, as best shown in FIG. 9.

As shown in FIG. 8, one or more reels 90 may be adapted to rotate in one direction to "open" the sliding door 50, and to rotate in an opposite direction to "close" the sliding door 50. The reel 90 may be adapted for manual, electric or hydraulic actuation, to suit user preference.

Although the present invention has been illustrated and described in connection with certain example embodiments, it will be understood that these embodiments are selective and are exemplary of the preferred embodiments of this invention, and it is intended that such revisions and adaptations will be construed as being within the limits of the scope of the accompanying claims.

What is claimed is:

1. A vertically actuated kennel door apparatus for selective access of an animal through an opening in a kennel wall, comprising:

a) a first channel guide having a first wall portion, a first side portion, a first panel portion, a bottom end portion and a top end portion;

b) a second channel guide having a second wall portion, a second side portion and a second panel portion in opposing alignment with the first channel guide;

c) a protective panel having a first panel side, a second panel side, a top panel side and a bottom panel side, the first panel side of the protective panel secured to the first panel portion of the first channel guide, with a portion of the first channel guide extending below the protective panel, and the second panel side of the protective panel secured to the second panel portion of the second channel guide, with a portion of the second channel guide extending below the protective panel;

d) a sliding door slidably received between the first channel guide and the second channel guide and between the protective panel and said kennel wall, said sliding door having a first door side, a second door side, a top door side and a bottom door side, the first door side slidably received between the first wall portion and the first panel portion of the first channel guide member, the second door side slidably received between the second wall portion and the second panel portion of the second channel guide member, the top door side extending behind and above the bottom of the protective panel when the sliding door is positioned in a closed position; and e) a cable secured to the top portion of the sliding door, for remote actuation of the sliding door between open and closed positions, said protective panel secured above and in front of the sliding door when the sliding door is in a closed position to protect the cable from being chewed upon by said animal when said animal is on the protective panel side of said kennel door apparatus.

2. The kennel door apparatus of claim 1, wherein a top weather strip is secured to the top side of the sliding door and the top weather strip extends between the first and second channel guide members.

3. The kennel door apparatus of claim 1, wherein a kennel door mounting aperture includes an enlarged clearance aperture in the panel side of the first and second channel guide members, a closely received aperture in the wall side of the first and second channel guide members, the closely received aperture being in alignment with the enlarged clearance aperture, and the closely received aperture sized to receive and secure a fastening means there-through.

4. The kennel door apparatus of claim 1, wherein a grommet is secured to a cable aperture in the top panel side of the protective panel.

5. The kennel door apparatus of claim 1, wherein the cable is a twisted metal cable having a size selected from a range of from one-eighth of an inch in diameter to three-eights of an inch in diameter.

6. The kennel door apparatus of claim 1, wherein the sliding door is a metal panel having a thickness selected from a range of from 0.018 to 0.375 of an inch.

7. The kennel door apparatus of claim 1, wherein the sliding door is a translucent sheet of plastic having a thickness selected from a range of from 0.120 to 0.375 of an inch.

8. The kennel door apparatus of claim 1, wherein the first and second channel guide members are extruded of aluminum and cut to length.

9. The kennel door apparatus of claim 1, wherein at least one pulley is used to guide the cable to a remote location for manual actuation by a pivotally secured lever.

10. The kennel door apparatus of claim 1, wherein the sliding door is made of opaque plastic having a thickness selected from a range of from 0.120 to 0.375 of an inch in thickness.

11. The kennel door apparatus of claim 1, wherein a remotely positioned reel is selectively actuated to rotate in one direction to roll up said cable on said reel to open the sliding door, and the reel is selectively actuated to rotate in the opposite direction to unroll said cable from said reel to close the sliding door.

12. The kennel door apparatus of claim 1, having an opening in a kennel wall, wherein the kennel door apparatus has a door opening attachment extending through said opening in said kennel wall.

13. The kennel door apparatus of claim 1, wherein opposing protective panels are secured to the first and second channel guide members to protect the cable from being chewed from either side of the kennel door apparatus.

* * * * *